UNITED STATES PATENT OFFICE.

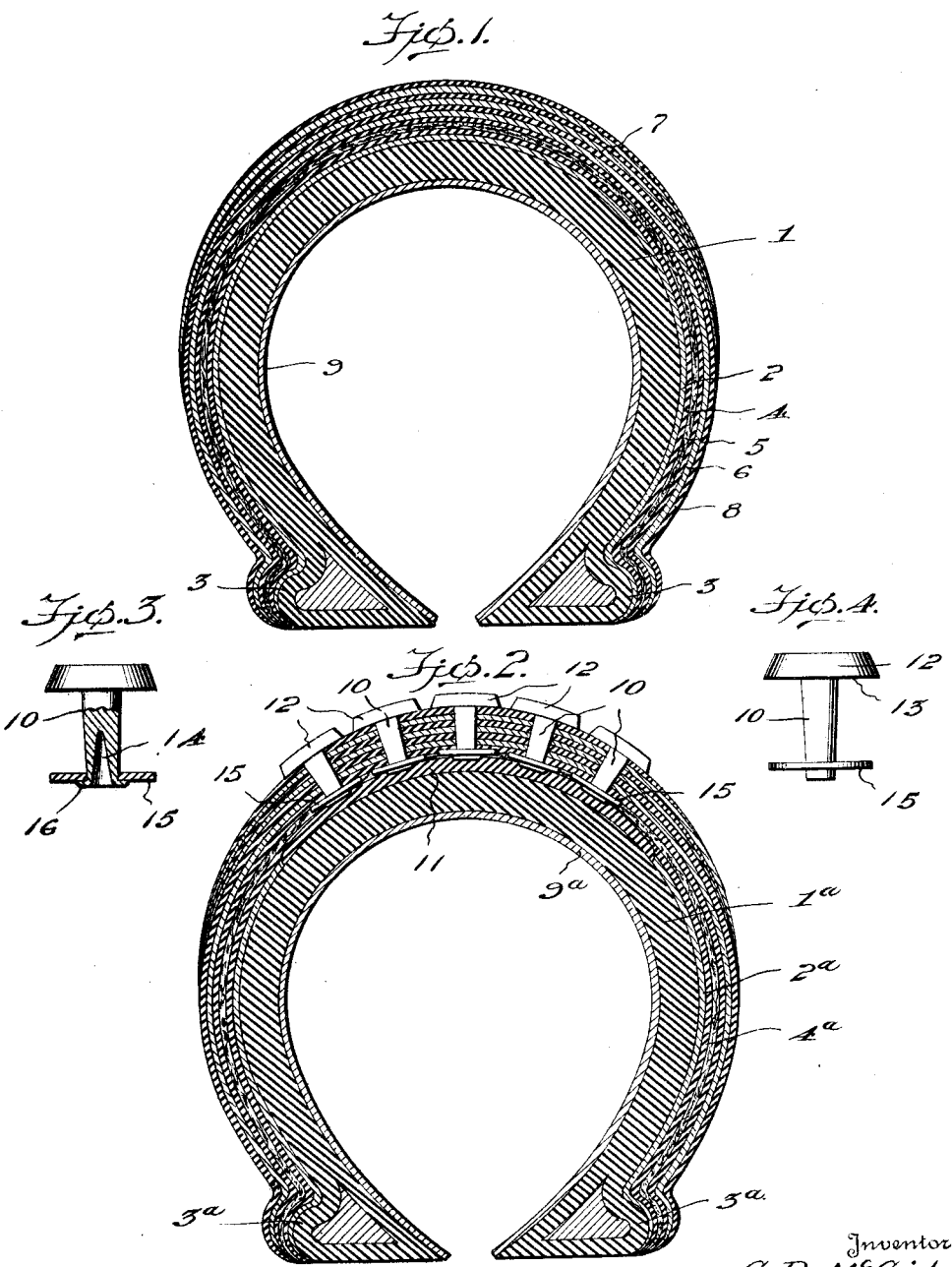

CORNELIUS D. McGIEHAN, OF JERSEY CITY, NEW JERSEY.

PROCESS OF RETREADING OLD AUTO-TIRES.

1,171,449.   Specification of Letters Patent.   Patented Feb. 15, 1916.

Application filed January 8, 1915. Serial No. 1,261.

*To all whom it may concern:*

Be it known that I, CORNELIUS D. MC-GIEHAN, a citizen of the United States, residing at Jersey City, in the county of Hudson and State of New Jersey, have invented certain new and useful Improvements in a Process of Retreading Old Auto-Tires; and I do hereby declare the following to be a full, clear, and exact description of the invention, such as will enable others skilled in the art to which it appertains to make and use the same.

This invention relates to processes for rebuilding or retreading old automobile tires, and to rebuilt tires made in accordance with the process, and one of the principal objects of the invention is to provide a rebuilt tire which will be strong, durable and efficient, and which will reduce the cost by providing a rebuilt tire which will be fully as efficient if not more so than the original tire.

Another object of the invention is to provide a rebuilt tire which will have a non-skid tread surface, and in which the tire protector will cover the entire tread portion, and in which an interior reinforcing lining of duck will be provided for the old tire or carcass, thus providing practically a new tire at comparatively low cost.

The foregoing and other objects may be attained by means of the construction illustrated in the accompanying drawing and the process hereinafter disclosed.

In the accompanying drawing: Figure 1 is a sectional view taken through a rebuilt tire made in accordance with this invention, Fig. 2 is a similar view of a tire provided with a series of steel studs the heads of which project from the tread surface to provide a non-skid tire. Fig. 3 is a detail sectional view taken through one of the studs upset upon a washer, and Fig. 4 is a side elevation of one of said studs before the upsetting operation.

In carrying out the invention an old carcass or worn out tire 1 is first covered by a layer 2 of canvas, said canvas being first treated to increase its strength and to fill the interstices and each particular thread with rubber. The canvas layer is passed through calender rolls and given a frictional surface with a heavy coat of rubber. The layer 2 envelops the entire outer surface of the old tire 1 and also covers the beads 3 upon the surface. After the layer 2 has been secured to the carcass 1 a layer 4 of asbestos cloth, provided with a frictional coating, is applied next to the inner layer 2, said asbestos layer also extending throughout the entire tire and over the bead 3, as shown in Figs. 1 and 2 of the drawing. The next layer 5 is of treated and frictionized canvas similar to the layer 2, and then the next layer 6 is of asbestos and then the tread portion is built up by intermediate layers 7 of canvas and asbestos cloth treated as already described, after which the outer layer 8 may be of hardened and strengthened canvas frictionized as described.

The old tire or carcass 1 may be reinforced on the inside with a lining of frictioned duck 9.

After the old tire or carcass has been treated as described, an air bag is inserted and the carcass is wrapped with wet strips of muslin, and plates are clamped on the sides of the carcass and the entire product is then vulcanized to secure all the parts together and make a homogeneous tire rebuilt as described and providing a strong, durable tire at an expense much less than the cost of a new tire and providing a very superior puncture proof, non-skid tire.

Referring to Fig. 2 of the drawing, the old tire or carcass $1^a$ is covered by the frictionized and treated canvas $2^a$, the layer of treated asbestos cloth $4^a$, both layers extending over the beads $3^a$, as shown, and the various layers are made up substantially as described with reference to Fig. 1. The built up tread of the tire is provided with a number of steel studs 10 which extend through the tread surface and their upset ends bear against a comparatively thick rubber cushion 11. The steel studs are each provided with a flat head 12 which is preferably larger in area upon its under surface 13 and said head has connected to it integrally a tapering shank 10, which is provided with a tapering bore 14. A washer 15 is placed upon the hollow tapered end of the shank and is then upset as shown at 16 in Fig. 3 with the thread portion between the head and washer. A suitable reinforcing lining $9^a$ of frictionized duck may be applied to the inner side of the carcass $1^a$, after which the entire product is wrapped with strips of wet muslin clamped at the sides, and vulcanized.

The first step in the process is to clean the old tire or carcass 1 and to apply the layers as described, and if a non-skid tire is required, the steel studs are inserted in the tread portion and supported by the cushion 11.

Various changes in the details of construction and in the steps of the process may be resorted to without departing from the spirit and scope of the invention as defined in the claim.

What is claimed is:—

A process of retreading tires which consists in cleaning the old tire or carcass, reinforcing the interior of the same, applying to the outer surface a layer of frictionized canvas having all the interstices filled with rubber, and a thick outer coating of rubber, applying a rubber reinforcing layer to the outer tread portion of the tire, building up the tire of intermediate layers of asbestos frictionized cloth and canvas, connecting to the tread portion of the layers steel studs having heads on the outer side or tread surface, and said studs being upset upon the inner side of the tread surface, said tire being then wrapped, clamped, inflated and vulcanized.

In testimony whereof I affix my signature in presence of two witnesses.

CORNELIUS D. McGIEHAN.

Witnesses:
DANIEL CAPAM,
EUGENE A. RIORDAN.